Aug. 14, 1951

M. ARTZT 2,564,556

LINE DELAY IN FACSIMILE

Filed Feb. 26, 1948

2 Sheets-Sheet 1

Inventor:
MAURICE ARTZT

By Oscar C. Mitchell
ATTORNEY

Aug. 14, 1951 M. ARTZT 2,564,556

LINE DELAY IN FACSIMILE

Filed Feb. 26, 1948 2 Sheets-Sheet 2

Inventor:
MAURICE ARTZT
By [signature]
ATTORNEY

Patented Aug. 14, 1951

2,564,556

UNITED STATES PATENT OFFICE 2,564,556

LINE DELAY IN FACSIMILE

Maurice Artzt, Princeton, N. J., assignor to Radio Corporation of America, a corporation of Delaware Application February 26, 1948, Serial No. 11,250

3 Claims. (Cl. 178—6.7)

This invention relates to compensation of transmission line delays and more particularly to compensation of differences in delay times of various signal components when transmitted over a line which is not properly equalized for delay distortion.

For ordinary voice transmission delay distortion is relatively unimportant, but for more critical purposes, such as facsimile transmission, it has been customary to use elaborate delay networks in order to equalize the delay over the entire transmitted band to a fraction of a millisecond. Such networks are expensive and troublesome and usually have to be distributed along the line instead of being disposed in one location.

The primary object of this invention is to use ordinary lines for critical purposes and to apply delay correction in the transmitting or receiving apparatus.

A related object is to avoid the use of delay networks.

A more specific object is to transmit facsimile signals over ordinary telephone lines which are long enough to make delay distortion a problem.

Other objects and advantages of the invention will become apparent as the description proceeds.

The above objects are accomplished by dividing the required band of frequencies into a plurality of discrete frequency bands or sections, each containing a portion of the band, transmitting one section directly without a carrier, modulating the other sections on a carrier or carriers above the highest directly-transmitted component, and physically spacing (relative to time) transducing devices associated with the respective sections. The differences in line-delay time for the several sections can then be compensated by adjustment of the spacing so that, when reproduced, the sections are recombined in their original relation. Thus, the delay distortion of the line can be substantially overcome without using delay networks.

The present invention will be understood more clearly by reference to the following detailed description of two illustrative arrangements, in connection with the accompanying drawings in which.

In the several figures, like reference characters indicate similar parts.

As an example selected for illustration, the signals may cover a range of frequencies from 0 to 1000 cycles per second. According to customary practice, this band of frequencies would be modulated on a carrier of about 2400 cycles, the upper side band attenuated to 200 cycles, and provision made for transmitting 200 cycles below the lower side band. Hence, a band of 1200 to 2600 cycles must be transmitted with constant delay time. However, since 2600 cycles is near the cutoff of an ordinary telephone line (approximately 2800 cycles), the delay time increases rapidly at the upper end of the band and picture quality suffers.

Figure 1:
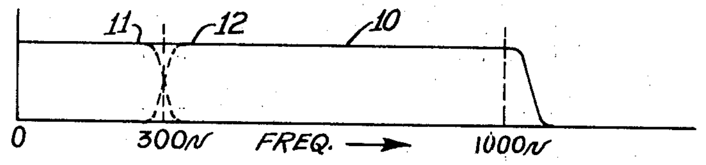
Fig. 1 shows the spectrum of a facsimile signal.
Figure 2:
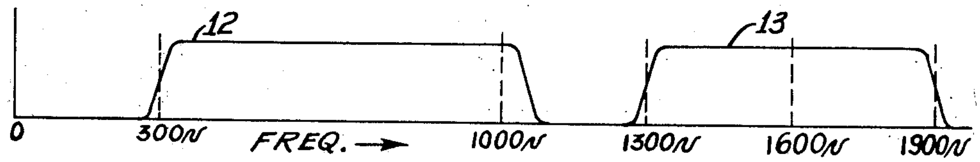
Fig. 2 shows the spectrum divided according to the invention.

In the arrangements selected to illustrate the present invention, the same 0 to 1000 cycle band is assumed, as indicated by curve 10 in Fig. 1. This band may be divided into a low-frequency section 11 and a high-frequency section 12 by filters which cross at a suitable intermediate frequency, for instance, 300 cycles. The lower section 11 is modulated on a carrier of sufficiently high frequency that the lower side-band will not interfere with the upper limit of section 12. Either amplitude or frequency modulation may be used. A suitable carrier frequency is 1600 cycles which, when so modulated, will occupy the portion of the spectrum from 1300 to 1900 cycles as indicated at 13 in Fig. 2. The high-frequency section 12 is not changed. It will be noted that the two sections thus transposed require a maximum frequency of only 1900 cycles, which is considerably further removed from the line cut-off frequency (2800 cycles) than the 2600 cycle upper limit mentioned in the above example of customary practice.

Figure 3:
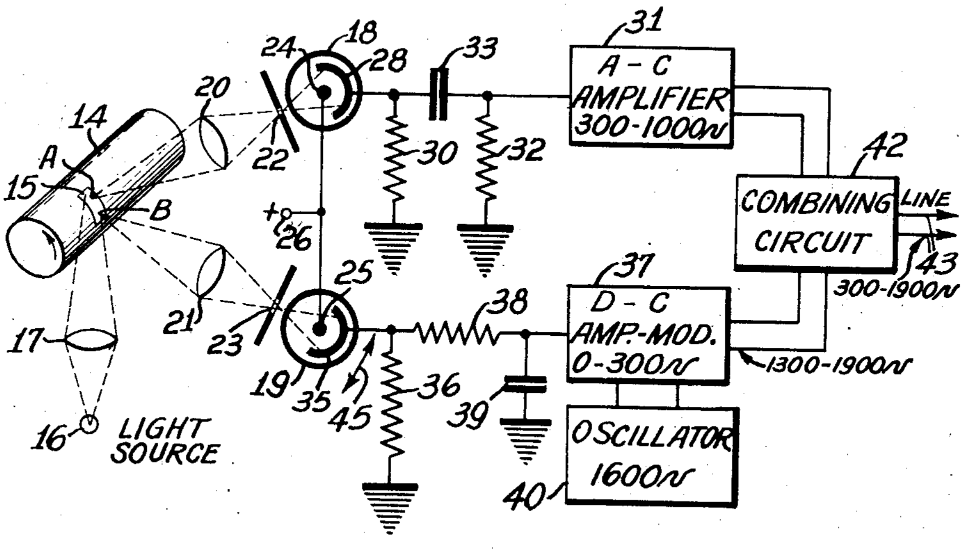
Fig. 3 is a diagram of facsimile transmitting apparatus for an arrangement employing the invention.

Fig. 3 illustrates schematically how the transposition of sections 11 and 12 is brought about in connection with two transducers in a facsimile transmitter according to the invention. A rotatable cylinder or drum carrying subject copy is indicated at 14. An elongated area 15 thereof is illuminated substantially uniformly by a light source 16 focused by an optical system indicated by lens 17. Two transducers are arranged to receive light reflected from area 15 along a scanning line which, according to usual practice, travels spirally from one end of drum 14 to the other. The transducers may comprise photoelectric cells 18, 19 having optical systems indicated by lenses 20, 21 which are focused on points A and B, respectively, in the same scanning line within the area 15. Between photocell 18 and lens 20 is a shield or diaphragm provided with a narrow slit 22. Between photocell 19 and lens 21 is a shield or diaphragm provided with a relatively wide slit 23. In the example illustrated, slit 22 should be narrow enough to resolve frequencies at least as high as 1000 cycles, whereas slit 23 should be wide enough to resolve frequencies only from zero to slightly above 300 cycles. The anodes 24, 25 of the respective photocells are supplied with positive potential from a source 26.

The cathode 28 of photocell 18 is connected to ground through an output resistor or impedance 30, and to an amplifier 31 (suitable for the 300 to 1,000 cycle band) through a high-pass filter system indicated by grounded resistance or inductance 32 and series condenser 33. While only one section of such a filter is indicated it should be understood that as many sections may be used as are necessary to obtain the desired sharpness of cut-off at 300 cycles.

The cathode 35 of photocell 19 is connected to ground through a high output resistor or impedance 36 and to an amplifier-modulator 37 (suitable for the 0 to 300 cycle band) through a low-pass filter indicated by series resistance or inductance 38 and shunt condenser 39. As many additional sections of such filter may be used as are necessary for the desired sharpness of cut-off at 300 cycles. An oscillator 40 provides a 1,600 cycle carrier for the amplifier-modulator 37.

The outputs of 31 and 37 are connected to a combining circuit 42 by which they are impressed upon an ordinary telephone line 43 for transmission thereover.

Either one or both of the above mentioned transducers (comprising optical system, slit, and photocell) may be arranged to be adjustable in the direction of the scanning line on area 15, as indicated by the double-ended arrow 45. This adjustment may be a swinging movement about the axis of drum 14 as a center. It is understood that either the drum 14 or the transducers are arranged to move in the direction of the drum axis so as to scan the subject copy.

The operation of the arrangement shown on Fig. 3 is as follows: The light beams reflected from points of actuation A and B in the scanning line are modulated in the same manner by the subject copy but at different times. The difference is the time required for the drum 14 to revolve from point B to point A, assuming counter-clockwise rotation of the drum. The modulated light from point A, after passing through optical system 20 and slit 22, is converted into electrical signals by photocell 18 which may contain all frequencies from 0 to 1,000 cycles. The 0 to 300 cycle band is attenuated by filter 32, 33; and the 300 to 1,000 cycle signals are amplified at 31 and transmitted over line 43. Similarly, the modulated light from point B, after passing through optical system 21 and slit 23, is converted into electrical signals by photocell 19 which may contain all frequencies from 0 to 300 cycles and some frequencies above 300 cycles. The wide slit 23 smoothes out the latter, thereby providing a partial filter effect. The higher frequencies are also attenuated by low-pass filter 38, 39 so that the 0 to 300 cycle signals appear in the output of amplifier-modulator 37 as upper and lower side-bands on the 1,600 cycle carrier from oscillator 40. The modulated carrier occupies the band from 1,300 to 1,900 cycles and is transmitted through combining circuit 42 and over line 43.

An ordinary telephone line will transmit the 1,300 to 1,900 cycle band with more delay than the 300 to 1,000 cycle band. By the adjustment indicated at 45, the spacing between points A and B may be made equivalent to such difference in delay times so that the 1,300 to 1,900 cycle band will be transmitted earlier but will arrive at the receiving end of line 43 at the same time as the 300 to 1,000 cycle band. Suitable demodulation will restore the 0 to 300 cycle signals (section 11, Fig. 1) to their original position with respect to the 300 to 1,000 cycle signals (section 12) and an ordinary facsimile receiver will reproduce the subject copy. In such reproduction the distortion which would have resulted from different delay times, is compensated by the spacing of points A and B.

It will be understood, of course, that instead of transmitting only one frequency band (section 11) as modulations on a carrier, such band may be subdivided into two or more sections and each transmitted on a separate carrier by duplicating the equipment shown in the lower part of Fig. 3 and making it independently adjustable. The band (section 12) which is transmitted directly may, of course, be narrower or wider than 300 to 1,000 cycles, this band having been selected for illustrating the invention because it is transmitted over an ordinary telephone line with substantially uniform delay.

Figure 4:
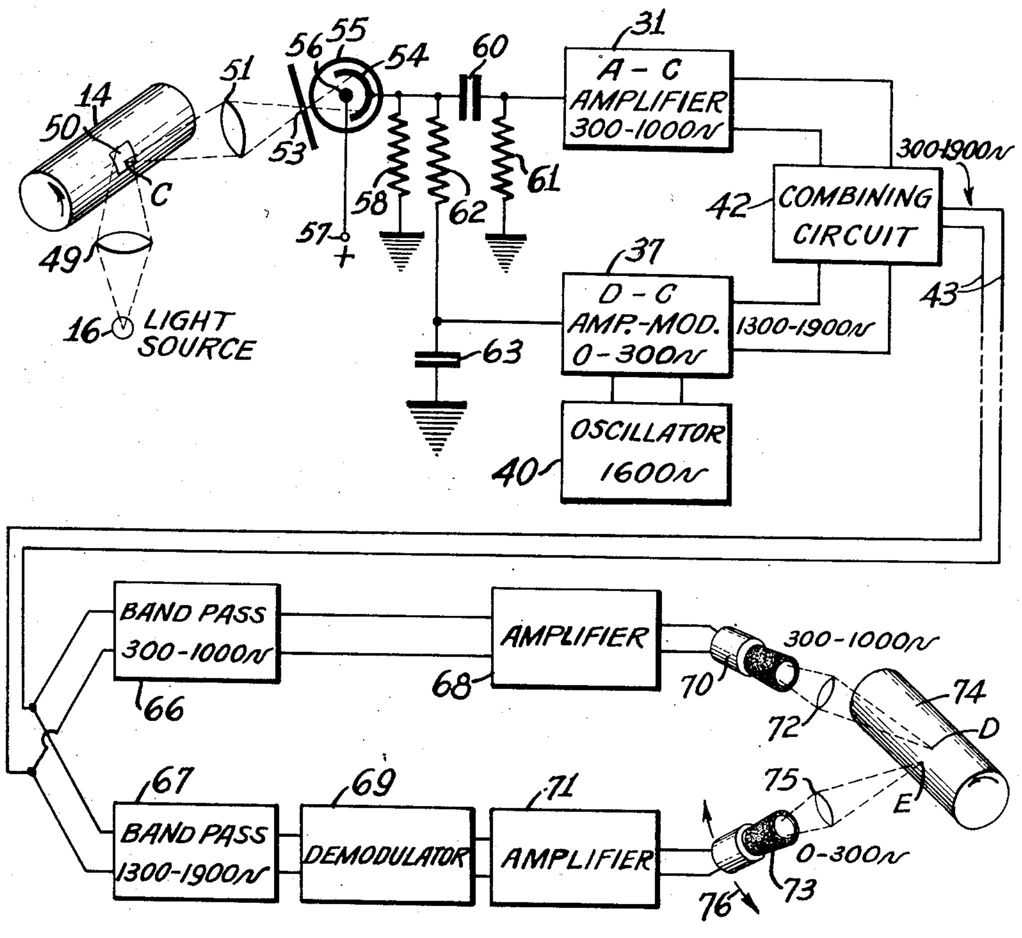
Fig. 4 is a modification of Fig. 3 and includes receiving apparatus in another arrangement.

Fig. 4 illustrates schematically both a transmitting system and a receiving system in which the spacing to correct for distortion time-delay is performed at the receiving end of a telephone line. Hence, only one transducer is used in the transmitter. In this arrangement the cylinder 14 carrying subject copy is illuminated from light source 16 through an optical system 49 so that a small area 50 is illuminated substantially uniformly. An optical system 51 is focused at a point C in a scanning line within area 50 and reflected light passes through a narrow slit 53 to the cathode 54 of photocell 55. The anode 56 of the photocell is provided with the usual positive potential from a source 57. The cathode 54 is connected to ground through an output resistance or impedance 58 and to both a high-pass and a low-pass filter. The high-pass filter comprises a series condenser 60 and shunt grounded resistance or inductance 61, suitable for the 300 to 1,000 cycle band. The low-pass filter comprises a series resistance or inductance 62 and shunt grounded condenser 63, suitable for the 0 to 300 cycle band. The output of filter 60, 61 is connected to amplifier 31 and the output of filter 62, 63 is connected to amplifier-modulator 37 provided with a 1,600 cycle oscillator 40, as in Fig. 3. The outputs of 31 and 37 are combined in circuit 42 and transmitted over telephone line 43.

The other end of line 43 is connected to two band-pass filters 66 and 67. Filter 66 passes the band from 300 to 1,000 cycles through amplifier 68 to a transducer which may comprise a recording lamp 70 having an optical system 72 focused on a scanning line of a receiving drum 74 at point D. The other filter passes the modulated carrier band (1,300 to 1,900 cycles) through a demodulator 69 and amplifier 71 to a transducer which may comprise a recording lamp 73 having an optical system 75 focused at point E on drum 74 in the same scanning line as point D.

Either one or both transducers may be adjustable as explained in connection with Fig. 3. Such adjustment is indicated at 76 in Fig. 4. It is understood that the scanning means at the respective ends of line 43 may be synchronized in known manner.

The operation of the arrangement shown in Fig. 4 is as follows: The light reflected from point C is modulated by the subject copy, and after resolution by slit 53, is converted by photocell 55 into signals covering the entire band from 0 to 1,000 cycles. The filters 60, 61 and 62, 63 separate this band into two sections similar to 11 and 12 as previously described. The high-frequency section from filter 60, 61 passes through amplifier 31 and combining circuit 42 to line 43. The low-frequency section from filter 62, 63 passes through amplifier-modulator 37 whereby it is modulated on the 1,600 cycle carrier. The resulting band of frequencies from 1,300 to 1,900 cycles passes through combining circuit 42 to line 43. The two bands are, therefore, transmitted simultaneously but when they arrive at the receiving end of line 43 the 1,300 to 1,900 cycle band will be delayed more than the 300 to 1,000 cycle band. Filter 66 selects the latter which is amplified at 68, converted into light variations at 70 and recorded on drum 74 at point D. Similarly, the 1,300 to 1,900 cycle band is selected by filter 67, demodulated at 69, amplified at 71, and the 0 to 300 cycle band of signals thus obtained is converted into light variations at 73 and recorded on cylinder 74 at point E.

By adjusting the position of transducer 73, 75 with respect to transducer 70, 72 (as indicated by double-ended arrow 76) the spacing between points D and E can be made equal, in time, to the difference in delay times between the two bands of received signals. Inasmuch as the 0 to 300 cycle section is delayed more by reason of its transmission on a higher frequency carrier, point E should lead point D relative to the counter-clockwise rotation of drum 74. When the spacing is properly adjusted, therefore, the two sections 11 and 12 will be recorded in proper relation to each other.

For adjusting the apparatus above described and also for checking its operation, it is convenient to transmit and receive a checker-board pattern so that distortion can be readily observed and corrected.

The invention described has general application to the transmission of a band of frequencies over a line which causes delay distortion and, therefore, is not limited to facsimile systems or to the particular apparatus selected as an example.

What is claimed is:

1. In apparatus for transmitting intelligence in the form of a band of frequencies, the combination of a plurality of transducers for deriving the intelligence, means for spacing said transducers apart relative to time of actuation thereof, means for dividing said frequency band into a plurality of discrete frequency bands and displacing all but one of them to positions higher in the frequency spectrum, said transducers being spaced apart according to the differences in delay times for the transmission of said discrete bands, and means for recombining said discrete bands into their original relative positions in the frequency spectrum.

2. In a system for transmitting intelligence over a line having delay distortion, the combination of a moving member carrying the subject matter to be transmitted at one end of said line, a moving member for receiving the reproduced subject matter at the other end of said line, two transducers operatively associated with one of said moving members, means whereby their points of actuation is spaced apart relative to the rate of motion a distance corresponding to the distortion time-delay of the line, and a third transducer operatively associated with the other of said moving members.

3. A facsimile transmitter comprising a moving member having means to carry subject copy, scanning means having two phototubes and individual optical systems therefor, means for focusing said optical systems upon spaced points in a scanning line, a high pass filter and amplifier for the output of one phototube, a low pass filter and amplifier for the output of the othe phototube, means for modulating the latter output upon a carrier, and means for impressing the modulated carrier and the first output upon a telephone line having delay distortion; the spacing of the points in the scanning line being adjustable to correspond to the difference in time delay between the first output and said modulated carried when transmitted over the telephone line.

MAURICE ARTZT.

REFERENCES CITED

The following references are of record in the file of this patent:

UNITED STATES PATENTS

| Number | Name | Date |
|---|---|---|
| 1,491,357 | Nichols | Apr. 22, 1924 |
| 1,671,302 | Mathes | May 29, 1928 |
| 1,681,252 | Nyquist | Aug. 21, 1928 |
| 1,749,045 | Nyquist | Mar. 4, 1930 |
| 1,769,920 | Gray | July 8, 1930 |
| 1,905,714 | Horton | Apr. 25, 1933 |
| 1,910,254 | Keller | May 23, 1933 |
| 2,029,395 | Smith | Feb. 4, 1936 |
| 2,105,318 | Goldsmith | Jan. 18, 1938 |
| 2,185,806 | Finch | Jan. 2, 1940 |
| 2,226,728 | Lalande | Dec. 31, 1940 |
| 2,446,635 | Cooley | Aug. 10, 1948 |